June 13, 1961 W. M. NYE 2,988,604

RECORDING AND REPRODUCING SYSTEM

Filed April 20, 1954 3 Sheets-Sheet 1

INVENTOR.
WILLIAM M. NYE
BY Albert H. Kirchner
ATTORNEY

June 13, 1961 W. M. NYE 2,988,604

RECORDING AND REPRODUCING SYSTEM

Filed April 20, 1954 3 Sheets-Sheet 2

INVENTOR.
WILLIAM M. NYE

BY Albert H. Kirchner

ATTORNEY

RECORDING AND REPRODUCING SYSTEM

Filed April 20, 1954 3 Sheets-Sheet 3

INVENTOR.
WILLIAM M. NYE
BY Albert H. Kirchner
ATTORNEY 2,988,604
RECORDING AND REPRODUCING SYSTEM
William M. Nye, 6633 58th St. NE., Seattle, Wash., assignor of one-half to James A. Fraser, Bellevue, Wash.
Filed Apr. 20, 1954, Ser. No. 424,330
19 Claims. (Cl. 179—100.2)

This invention relates to a system of recording and reproducing dictated messages, and other intelligence. More particularly it is concerned with providing a novel recording and transcribing or reproducing unit connectible to an endless magnetic recording tape so as to make it possible for the dictator and the transcriber to be remotely located with respect to each other, while at the same time permitting dictation and transcription of messages either at the same time or at different times without attention from either operator excepting to start and stop the recorder-reproducer.

Various dictating and transcribing devices have been previously proposed which can be operated simultaneously both for dictation and transcription of messages. These have not proved satisfactory, however, for one or more reasons. One of the principal reasons has been the fact that these devices usually required an excessive number of complicated mechanical parts in addition to extremely complex wiring systems. Because of the overall complexity of these devices not only was the cost of manufacture increased to an amount which prohibited commercial exploitation, but in addition the maintenance and repair of these devices could only be accomplished by employing highly trained and skilled technicians.

The use of a considerable number of moving mechanical parts also increased the danger of faulty operation and breakdown of these prior art devices due to wear of the mechanical parts.

In addition, because of the size of the housings or containers required to hold the complex equipment of these prior devices, they could not be readily installed in an office without taking up an inordinate amount of valuable space.

Furthermore, where cylinder type records, which have a limited period of life, where employed as the recording and transcribing mediums, a shaving operation was required for erasing the transcribed messages before the cylinders could be reused. This shaving operation had to be properly synchronized with the dictating and transcribing operations, and it required special complex and expensive shaving equipment in addition to the transcribing and dictating equipment. The unit also required operator attention from time to time to install new records and remove record shavings.

The novel dictating and transcribing system of the present invention possesses none of the aforesaid disadvantageous features. The equipment used therewith employes a minimum number of moving mechanical parts, thus reducing wear and maintenance. It relies heavily on electrical parts which will last indefinitely. The entire system consists of a combination recorder-reproducer unit having a plurality of storage bins associated with it for simultaneously housing different portions of an endless tape. Appended to and electrically connected to this unit are transcribing and dictating instruments which may or may not be remotely placed. The dictating or transmitting instrument and the transcribing or reproducing instrument, together with the recorder-reproducer unit, may be conveniently housed in small compact boxes or containers which will take up a minimum amount of space in the location where the system is to be used.

In the novel recording and transcribing system of the instant invention the dictator need only dictate his message into the transmitting instrument connected to the recording unit, stopping and starting it by means of a suitable control at the dictating or transmitting instrument used by him. The secretary need only stop and start the transcribing unit by means of suitable foot control pedals as she transcribes the message dictated on an endless tape. No attendant is required for operating the various units such as changing magnetic tapes, discs, cylinders, etc., and the unit needs no special attention other than the usual maintenance and repair common to any electromechanical equipment.

There are no records to change, tapes or wires to reverse or rewind, and no records to shave or replace. The dictator may dictate a message into the dictating unit. As soon as he starts, or at any time thereafter, the secretary may begin transcribing the message dictated regardless of whether the dictator has finished or not. Thus, the dictator and transcriber may use their respective parts of the unit simultaneously and constantly without waiting for the other to finish and without interruption to change discs, cylinders, or rewind tapes, or attend the unit in any manner.

Accordingly, it is an object of this invention to provide a novel recording and transcribing apparatus, in a combined message recording and reproducing system which can be used simultaneously by both the dictator and transcriber without at the same time having either of them hamper or retard the activities of the other.

It is another object of this invention to provide a novel combined dictating and transcribing system which can be operated for the simultaneous dictation and transcription of messages, while employing an endless magnetic tape as the medium for recording messages.

It is a further object of this invention to provide a novel combined dictating and transcribing system employing an endless magnetic tape as the recording medium, wherein messages may either be recorded onto the tape and be transcribed at substantially the same time, or be recorded on the tape and then transcribed at a later time.

It is further object of this invention to provide a novel combined dictating and transcribing system employing an endless magnetic tape as the recording medium, wherein a plurality of storage bins are provided for receiving portions of the tape on which messages have been recorded as well as portions of the tape from which recorded messages have been transcribed.

It is another object of this invention to provide a novel combined recording and transcribing system employing an endless magnetic tape as the recording medium, wherein novel means are employed both by the dictator and transcriber for actuating or moving the tape across sound recording and reproducing heads to dictate messages on and transcribe dictated messages from different portions of the tape either at the same or different times, as well as independently of each other.

It is a further object of this invention to provide a novel combined sound recording and reproducing system employing an endless magnetic tape as the recording medium comprised of a minimum amount of mechanical and electrical components.

A further object is to provide a novel combined sound recording and reproducing system utilizing an endless magnetic tape as the recording medium, which can be inexpensively manufactured and installed in a minimum amount of space.

Another object is to provide a novel combined dictating and transcribing system employing an endless magnetic tape as the sound recording medium, wherein the dictator and transcriber may be remotely positioned with respect to each other.

Another object is to provide a novel combined dictating and transcribing system employing an endless magnetic tape as the recording medium, wherein novel storage means are provided for the different portions of the tape on which a message has been dictated or from which a message has been transcribed, together with novel means for delivering the different portions of the tape to the storage means.

It is another object of this invention to provide a novel combined dictating and transcribing system employing an endless magnetic tape as the recording medium, which can be operated simultaneously and or independently both for dictation and transcription, and wherein novel means are provided for the dictator to play back portions of tape on which dictation has been placed.

It is another object of this invention to provide a novel combined dictating and transcribing system employing an endless magnetic tape as the recording medium, which can be operated simultaneously both for dictation and transcription, wherein novel means are also employed for reversing different portions of the tape at any time so that either the dictator or transcriber, independently of each other, may play back portions of the tape on which a message has been recorded.

Another object of this invention is to provide a novel combined dictating and transcribing system involving the use of an endless magnetic tape, wherein novel means are employed for erasing dictated messages from the tape after the messages have been transcribed.

Another object of this invention is to provide a novel combined recording and reproducing system involving the use of magnetic tape wherein novel means are provided so that the recorded intelligence may be reproduced at some time after it is recorded and while it is still being recorded.

These and other objects are attained by providing a novel combined recording and reproducing system comprising the combination of a recording medium, means for recording intelligence on the recording medium, means for reproducing the intelligence recorded on the recording medium, and means for connecting both the recording and the reproducing means to different portions of the recording medium either simultaneously or at different times and independently of each other.

A preferred embodiment of the invention is shown in the appended drawings, wherein.

Referring particularly to FIGS. 1–6, it will be observed that the sound recording and reproducing device of the invention is generally comprised of a dictating unit or instrument 1, a main transcribing unit or instrument 2, and a combined recorder and reproducing unit 3 provided with a cabinet or equipment box for housing the various mechanical parts of the unit, together with a suitable electrical control circuit connecting the said instruments together.

Figures 3, 4, 5:
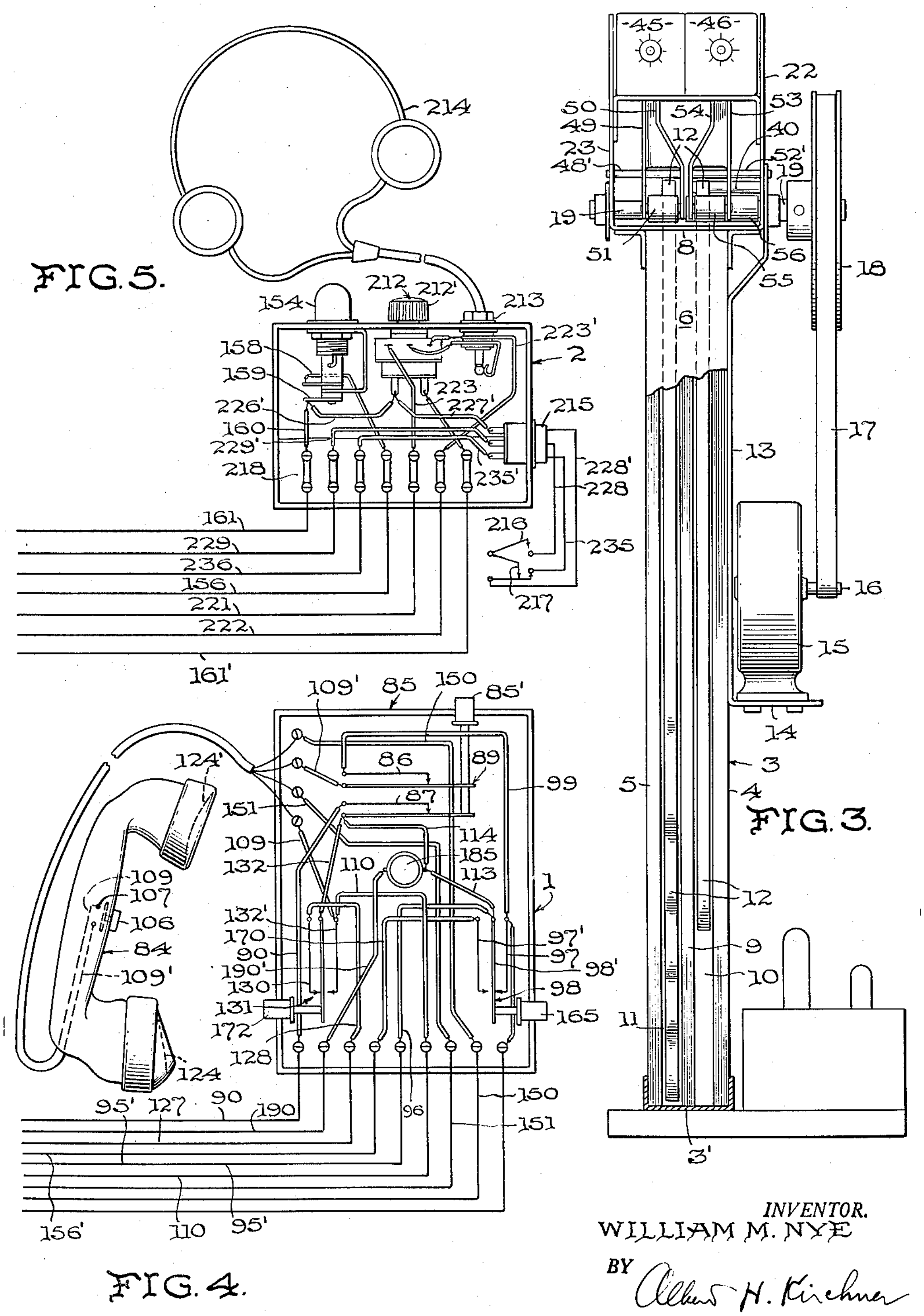
FIG. 3 is an end elevational view of the recording-reproducing unit shown in FIG. 1, taken along the line 3—3 thereof, and with parts removed for the sake of clarity.
FIG. 4 is a plan view with parts removed of the dictating instrument forming part of the recording and reproducing system of the invention and discloses a portion of the electrical control circuit therefor.
FIG. 5 is a plan view with parts removed of the transcribing instrument of the invention and discloses another portion of the electrical control circuit therefor.

The main unit cabinet is provided with a base 3', side walls 4 and 5, end walls 6 and 7 and a top 8 secured to these walls. The interior of the cabinet is divided by a spacing member or partition 9 into two separate storage bins 10 and 11 for receiving portions of the endless magnetic recording tape recording medium 12. Affixed to the outer surface of side wall 4, as indicated in FIG. 3, is an elongated bracket 13 provided with a shelf portion 14 which serves as a mounting base for a pair of electric motors 15 and 15'. Electric motor 15 drives a motor shaft 16 about which is trained the endless belt 17. Motor 15' in turn drives a motor shaft (not shown) about which the endless belt 17' is trained.

Figure 1:
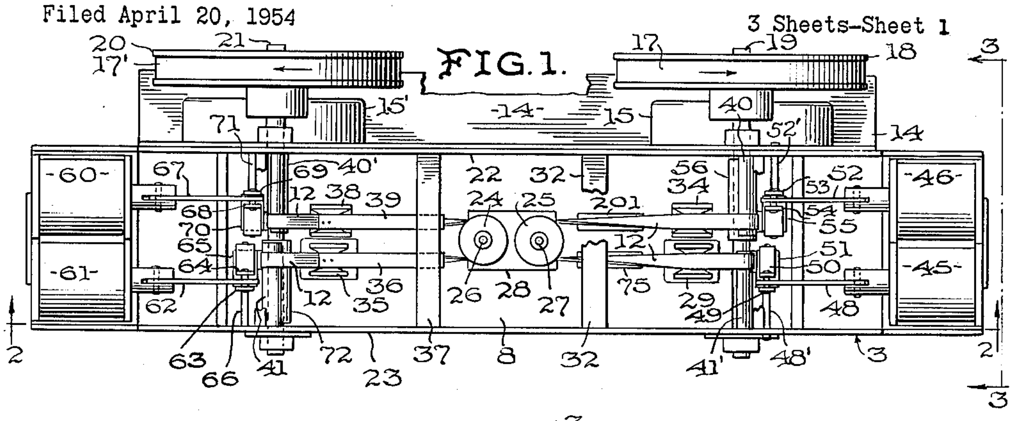
FIG. 1 is a plan view with parts broken away of the combined recorder reproducing unit of the invention.
Figure 2:
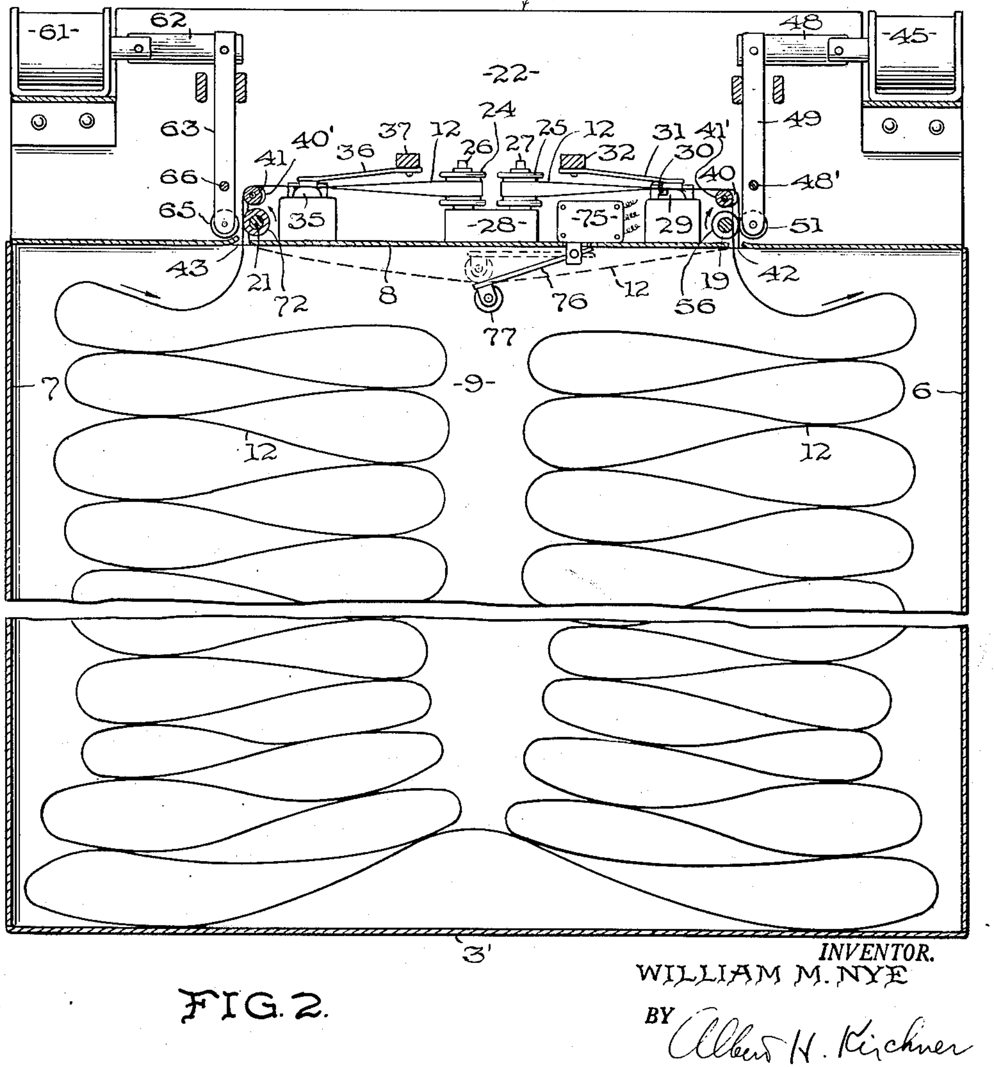
FIG. 2 is a vertical sectional view of the combined recording and reproducing unit shown in FIG. 1, taken along line 2—2 thereof and with part removed for the sake of clarity.

Endless belt 17 is also trained about the flanged disc 18, journaled on shaft 19 mounted on the control unit cabinet. Thus, upon the energization of motor 15, disc 18 will be rotated in a clockwise direction as shown in FIG. 1, causing in turn rotation of shaft 19 in a similar direction. Endless belt 17' in turn is trained about a second flanged disc 20 spaced from disc 18 and journaled on a shaft 21 also mounted on the control cabinet. Thus, upon energization of motor 15', disc 20 and shaft 21 will be rotated in a counterclockwise direction.

Shafts 19 and 21 are mounted on the control unit cabinet by being located in suitable openings in the upstanding, spaced side flanges 22 and 23 of the cover 8 for the main unit cabinet. These flanges 22 and 23 also advantageously serve as protecting walls for the other mechanical parts of the control unit located upon the top 8 of the main unit cabinet.

These parts include a pair of spaced, vertically disposed and flanged spool members 24 and 25 for receiving different sections of the endless tape 12. Spool members 24 and 25 are freely mounted on the vertical shafts 26 and 27 respectively, secured to sockets in base member 28 located on top 8. These spool members are freely rotatable on their respective shafts. Located adjacent spool 25 is a conventional magnetic sound recording and reproducing head 29 of suitable design, also provided with an erasing coil element 30.

A tension spring arm 31 affixed to cross-bar 32 is adapted to hold the tape 12 in contact with the recording head 29 and erasing coil element 30 as the tape 12 passes over the latter. Bar 32 is secured at the opposite extremities thereof to the side flanges 22 and 23 of top 8.

Located adjacent one side of recording head 29 is a guide member 34 for directing portions of the tape 12 to spool 25 from storage bin 10. Mounted on the opposing side of top 8 of the control unit cabinet and substantially adjacent spool 24 is magnetic reproducing head 35. For the purposes of holding portions of the tape 12 against reproducing head 35, a spring tension arm 36 affixed to cross-bar 37 is employed. Cross-bar 37 is secured to the flanges 22 and 23 of top 8. After the tape has been directed across head 35 and around spool 24, it is then directed across the guide 38 by means of the spring tension arm 39 also affixed to cross-bar 37. A similar spring tension arm (not shown) connected to bar 32 is employed for holding the tape 12 in contact with the guide 34 for spool 25. The means for moving tape 12 across the various recording heads will now be described.

Located adjacent flange 22 and directly above a portion of shaft 19 is an idler roller 40. Located adjacent flange 22 and directly above a portion of shaft 21 is an idler roller 40'. Located adjacent flange 23 and directly above a portion of shaft 21 is another idler roller 41. Located adjacent flange 23 and directly above a portion of shaft 19 is another idler roller 41'. Rollers 40 and 40' are secured to flange 22 and rollers 41 and 41' are secured to flange 23. Located below and to one side of shaft 19 is an elongated slot 42 in the top 8 of the control unit cabinet, while a similar slot 43 in the top 8 is located below and to one side of shaft 21.

It will thus be observed that the endless tape 12 extends from storage bin 10 up and through slot 42, past shaft 19 and over roller 40, through guide 34, around spool 25, across erasing coil 30 and recording and reproducing head 29, and under spring arm 31, over roller 41', downward past shaft 19, through slot 42 and down into storage bin 11, where it falls into random folds having first been threaded up through slot 43 in top 8, of cabinet 3, past shaft 21 and around idler roller 41, across the reproducing head 35, under spring arm 36, and around spool 24. From spool 24 the tape 12 goes across guide 38, under spring arm 39, over roller 40' down past shaft 21, and then through slot 43, back again into storage bin 10 falling into random folds, completing the continuous loop. Storage bins 10 and 11 are of a size sufficient to hold several thousand feet of recording tape 12 in random folds. Bins 10 and 11 are so designed that in conjunction with openings 42 and 43 in top 8 the tape 12 may be withdrawn from or returned to bins 10 and 11 through either opening 42 or 43.

The means for accomplishing this movement of the tape will now be described. Located on the top 8 of the main unit cabinet on the same side as spool 25 are a pair of actuating solenoids 45 and 46. Solenoid 45 controls a lever 48 to which the upper extremities of the spaced roller arms 49 and 50 are connected. These arms are pivotally mounted on stub shaft 48', affixed to side flange 23. A roller 51 is secured to the bottom extremities of these roller arms. Solenoid 46 controls a lever member 52, to which the upper extremities of the spaced roller arms 53 and 54 are secured. These arms are pivotally mounted on stub shaft 52' affixed to side flange 22. A roller 55 is connected to the bottom extremities of these latter roller arms. Thus, when solenoid 45 is energized, arms 49 and 50 will be pivoted on shaft 48' and roller 51 will move forward and cause the tape 12 to contact shaft 19, which will then bear against the tape 12 and draw it into bin 11 and out of the bottom of bin 10. When solenoid 45 is de-energized and solenoid 46 is energized, arms 53 and 54 will be pivoted on shaft 52' and roller 55 will move forward and cause the tape 12 to bear against a sleeve member 56 attached to shaft 19 and cause the tape 12 to reverse itself and be sent into bin 10 and out of bin 11.

A similar electro-mechanical arrangement is employed for feeding the tape 12 into and out of bins 10 and 11 through opening or slot 43 in the top 8 at the other side of the cabinet for the main unit 3.

These means comprise the actuating solenoids 60 and 61. Solenoid 61 controls a lever 62, to which the upper extremities of the spaced roller arms 63 and 64 are secured. A roller 65 is connected to the bottom extremities of these latter roller arms. Roller arms 63 and 64 are also pivotally mounted on a stub shaft 66 secured to side flange 23. Solenoid 60 controls a lever 67, to which the upper extremities of the spaced roller arms 68 and 69 are secured. A roller 70 is secured to the bottom extremities of these latter roller arms. Roller arms 68 and 69 are also pivotally mounted on a stub shaft 71 secured to side flange 22. When solenoid 61 is energized, roller arms 63 and 64 will be pivoted on stub shaft 66 and roller 65 will force tape 12 against sleeve 72 mounted on revolving shaft 21 adjacent top flange 23, thereby causing the tape 12 to be fed across shaft sleeve 72 and into bin 11 through slot 43. When solenoid 60 is energized and solenoid 61 de-energized, roller arms 68 and 69 will be pivoted on shaft 71 and roller 70 will force tape 12 against shaft 21, thereby causing the tape 12 to be fed across shaft 21 and through slot 43 into bin 10, as it also draws the tape 12 out of bin 11 and into bin 10.

Affixed to the upper surface of top member 8 adjacent the top of bin 11 is switch 75 controlled by the tension arm 76 provided with a tape engaging roller 77. When the portion of the tape 12 located in bin 11 is stretched tightly between openings 42 and 43 in the top 8, the tape 12 will force the arm 76 up, as indicated in dotted lines in FIG. 2. A similarly controlled switch 201 is located on top 8 for tape stretched between slots 42 and 43 in bin 10. The functions of these switches will be described hereinafter.

A suitable type of control circuit for operating the main recording-reproducing unit 3 and for controlling the movement of tape 12 into and out of bins 10 and 11 during the recording on tape 12 by the instrument 1 and during the reproducing of messages from the tape 12 by the transcribing instrument 2 will now be described. These instruments or units may all be located in the same or different rooms and because of the storage of the tape 12 either in the bin 10 or bin 11, the dictator may dictate and record, and the transcribing may transcribe or reproduce completely independently of each other. As soon as the dictating or recording starts, or at any time thereafter, the secretary or reproducer may begin to transcribe or reproduce the dictation or intelligence recorded on tape 12 without regard as to whether or not the recorder has finished recording. In other words, both the recorder and the transcriber or reproducer may use the equipment simultaneously and constantly without interruption such as normally occurs in conventional systems when it is necessary to change records, rewind tape, or attend the units in any manner.

Figure 6:
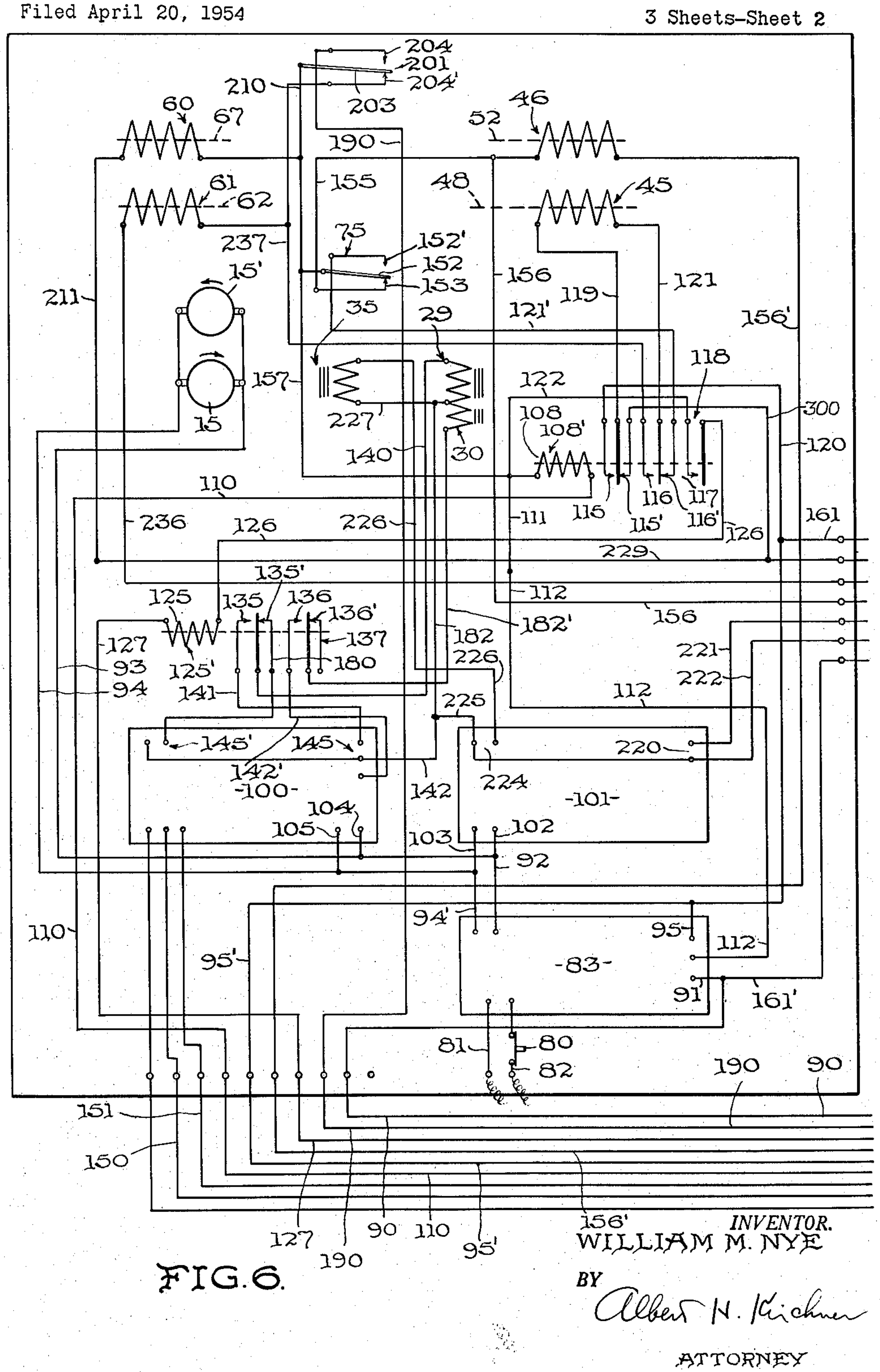
FIG. 6 is a diagrammatic view of the major portion of the control circuit for the recording and reproducing device of the invention.

As indicated in FIGS. 4–6, the control system for the devices of the instant invention generally includes a normally closed master switch 80 in the lead lines 81 and 82, which connect a suitable power supply unit 83 to the power source. Power supply 83 and amplifier 100 and 101 are of standard and conventional design well known in the trade.

The dictating instrument 1 includes a telephone type hand set 84. When the dictator lifts the instrument 84 from its cradle on the housing 85 a push button 85' will become raised and the contacts 86 and 87 of switch 89 will be closed. Closing of contact 87 energizes power supply 83 by connecting terminal 91, of the power supply control circuit, to terminal lead 95 thereof through conductors 90 to switch 87, through conductor 114, 113, 96 and 95'. Energizing power supply 83 permits current to flow from the power source through the power unit 83 to the electric motors 15 and 15' for driving the tape shafts 19 and 21 through the medium of the closed switch contacts of switch 80, conductors 81, 82, 94', 92, 93 and 94. Amplifiers 100 and 101 are also actuated by conductors 94', 92, 103, 102, 104 and 105. The lifting of instrument 84 also closes switch 86 connecting lead 109' with lead 99, thence to contact 97 of switch 98 controlled by the switch button 165, then to the input of amplifier 100.

With all of the aforesaid units energized, the unit is in a position to record any intelligence that may be transmitted into instrument 84. To record the recorder depresses the hand button 106 on the instrument 84, thereby closing switch 107. This causes energization of the coil 108 of the relay 108' by connecting relay 108' to the power supply unit 83 through the medium of conductors 109, 110, 111, 112 and through lead 95, conductors 95', 96, through normally closed contacts 98' and 97 of switch 98 through conductor 99, contact 86 of switch 89, and conductor 109'. Upon energization relay 108' acts to close contacts 115, 116 and 117 on switch 118, thereby energizing the solenoid 45 located on the control unit cabinet, referred to above. This is done by connecting solenoid 45 across the power supply unit 83. Solenoid 45 is connected to one side of unit 83 through the medium of conductor 119, switch contact 115 of switch 118, conductor 120 and lead 95 and to the other side of power unit 83 through the medium of conductor 121, switch contact 116 of switch 118, conductor 237, the closed switch contacts 203 and 204' of switch 201 and conductor 210, 157, 111 and 112, the latter of which is directly connected to power supply unit 83. Switch contacts 203 and 204' are closed at this time because the arm of switch 201 in bin 10 will be in a down position, since there will be tape stored in bin 10 at this time. This causes energization of solenoid 45. Upon energization solenoid 45 moves arm or lever 48 in the manner described above, whereby roller 51 controlled by lever 48 forces the tape 12 against the rotating shaft 19 over which the tape or recording medium 12 is loosely arranged. Roller 51 presses the tape 12 tightly against shaft 19. The rotation of shaft 19 caused by the energization of motor 15 and rotation of flanged disc 18 causes the tape to move across the recording head 29 and down into bin 11.

The microphone 124 and the earphone 124′ on instrument 84 are connected to the input and output respectively of amplifier 100 through conductors 150, 151, 99, switch contact 86 and conductor 109′.

As the dictator speaks into the transmitting instrument microphone 124, the magnetic impulses of the sound are amplified by amplifier 100 and then transferred to the coil of recording head 29 and on the tape 12. This is done in the following manner:

When the various contacts 115, 116 and 117 on switch 118 are closed upon the energization of relay 108′ referred to above, the coil 125 of relay 125′ was also energized. This was effected by connecting the coil 125 of relay 125′ to power supply unit 83, through the medium of conductor 126, switch contact 117 on switch 118, conductors 122, 111 and 112, as well as conductors 127, 128, contact 130 of switch 131, conductors 132, 114, 113, 96 and 95′ and lead 95. When the coil 125 of relay 125′ is energized, relay 125′ acts to close the contacts 135 and 136 of switch 137. This causes the recording-reproducing head 29 to be connected to the output of amplifier 100. This is accomplished through the medium of conductor 140 and closed contact 135 on switch 137, and conductor 141 leading to the output 145 of amplifier 100, as well as the conductor 182 and 142 also leading to the output of amplifier 100. The erase coil 30 is also connected to the output of amplifier 100 through the medium of conductors 182, 142, 182′, contacts 136 and 136′ of switch 137 and lead 142′.

The microphone 124 of the transmitting instrument 84 is connected to the amplifying unit 100 through the medium of conductors 150 and 151.

As the dictator continues to speak the tape 12 will be drawn across the erasing coil 30 where previous messages on the tape will be erased and then drawn across the recording head 29 where the intelligence becomes magnetically impressed upon the tape 12, thence down past the rotating shaft 19 and into storage bin of compartment 11.

As the tape 12 begins its travel down into the storage bin 11, it will release the pressure on the tension arm 76 of switch 75, putting tension arm 76 in the down position and closing the contacts 152 and 153 of switch 75.

The closing of contacts 152 and 153 on switch 75 causes energization of indicator light 154 on the transcribing instrument 2 by connecting the light 154 to the power supply source or unit 83. Indicator light 154 is connected to one side of the unit 83 through the medium of conductors 157, 111 and 112, the latter of which is a lead to power supply unit 83 and to the other side of unit 83 through the medium of conductors 155, 156, 158, 159, 160, 161 and conductor 120 leading to the power supply unit lead 95.

When light 154 is on, it is a signal to the transcriber that intelligence has been magnetically impressed on the tape 12 for transcription or reproduction. At the same time that light 154 is energized, it will be noted that the coil of solenoid 46 will be connected to one side of the power supply unit 83 by the closing of the switch contacts 152 and 153 of switch 75, so that it can be placed in a condition for energization if and when the dictator wishes to reverse the tape 12.

The dictator may stop and start the recording medium tape 12 by depressing switch button 106, which may be a self locking type of push button, for as long as is required, or until the supply of tape is exhausted. In addition, he may reverse the tape at any time so as to play back the same and listen to what he has already dictated. This is accomplished by releasing switch button 106 and by depressing button 165 controlling switch 98. This connects the coil of solenoid 46 referred to above to the power supply source 83. This is accomplished in the following manner. The depressing of button 165 causes contacts 98′ and 97′ of switch 98 to close, whereupon solenoid 46 is connected to one side of power source 83 through the medium of conductors 155, contacts 152 and 153 on switch 75, conductors 157, 111, and 112. Solenoid 46 is further connected to the other side of power supply unit 83 through conductors 156′, 170, switch 98 through contacts 97′ and 98′ thereof, conductors 96, 95′ and power supply unit lead 95.

When switch button 165 is depressed it will be noted that conductor 99 becomes disengaged from switch contact 98′ thus disconnecting switch 106 from the power supply 83 circuit, making it impossible to energize solenoid 45 when switch button 165 is depressed energizing solenoid 46. The energization of solenoid 46 will move lever 52 and roller arms 53 and 54 in such a manner that roller 55 connected thereto will press the tape 12 against the sleeve member 56 on rotating shaft 19. The tape will then be drawn across the guide roller 40 and sleeve member 56 down through opening 42 into the storage bin 10, where it is allowed to fold back onto itself.

Switch button 165 is released after the tape 12 is reversed sufficiently for the dictator's needs. Thereupon, for the purposes of playing back the transcribed portion of the tape, the dictator presses switch button 172 on the dictating instrument 1. Switch button 172 controls switch 131 and upon depression closes contacts 132′ thereof and causes solenoid 45 again to be energized. This in turn causes tape 12 to move back over recording-reproducing head 29 as heretofore described and in such a manner that the magnetic impulses inscribed on the tape 12 will be amplified through amplifier 100 and transmitted to the receiver element of the dictating instrument through conductors 150 and 151. This is done by connecting relay 108′ to one side of the power supply unit 83 through conductors 111 and 112 and to the other side of the power supply unit 83 through the medium of conductor 110, closed contacts 132′ of switch 131, and conductors 132, 114, 113, 96 and 95′ and lead 95 for power supply unit 83.

This energization of the coil 108 of relay 108′ closes the contacts 115, 116 and 117 of switch 118 in the manner previously described, thereby energizing solenoid 45. It is also to be noted, of course, that the lifting of the telephone instrument 84 from its socket or cradle on housing 85 had previously closed contacts 86 and 87 on switch 89, which in turn caused the energization of the power supply unit 83, amplifiers 100 and 101 and motors 15 and 15′ in the manner described above. Since the contact 130 of switch 131 on the dictating instrument is open at the time of dictation playback because of the depression of button 172, it will be noted that the coil 125 of relay 125′ will not be energized. This in turn will mean that the contact 135′ of switch 137 will then connect the recording head 29 to the input 145′ of amplifier 100 through the medium of conductors 140, 180, 182 and 142.

The receiver of the dictating instrument will in turn be connected to the amplifier by conductors 150 and 151 in the manner previously described.

By referring to FIGS. 4 and 6 of the drawings, it will be observed that when dictating switch 107 is closed, energizing relays 108′ and 125′ during the time dictation is placed on the tape 12, the contacts 135 and 136 are so arranged that the erasing coil of the coil of the erasing head 30 will also be energized along with the coil of the recording head 29, thus erasing all previous messages that might be on the tape 12. The erasing coil of erasing head 30 is not energized, however, when the tape 12 is being reversed or is moved forward in the playback position as relay 125 is not energized thus closing switch 137.

The recording medium of the instant invention, as stated above, is a continuous loop of magnetic tape 12. It may advantageously be approximately 2,000 feet in length, but of course is not necessarily limited to that length. When the several units are at rest, i.e., when there is no dictation on any portion of the tape 12, then substantially all of the tape is generally stored in bin 10. There it is disposed in random folds excepting that part which is threaded over the recording and transcribing heads 29 and 35.

When dictation has been placed on the tape by the dictator as described above, the tape is stored in random folds in storage bin 11. Because of the long length of tape 12 employed, it will be obvious, however, that portions of the tape may be stored in both of the bins 10 and 11 and the amount stored in each bin will in turn be dependent upon the amount of dictation that has been placed on the tape as well as the amount of dictation that has been transcribed.

After the machine has been used for a considerable period of time without the secretary or transcriber having transcribed any of the recorded messages on tape 12, the tape normally stored in bin 10 will become exhausted. At this point, the portion of the tape 12 between rollers 25 and 24 in bin 10 will become taut and press against a roller (not shown) affixed to a lever arm (not shown) and suspended from the top 8 of the cabinet of the recorder-reproducer unit 3, and within bin 10. This lever arm is similar to the lever arm 76 suspended in bin 11. The lever arm in bin 10 controls the switch 201 and as it is pushed up, it closes the contacts 203 and 204 on this switch. This in turn causes energization of indicating light 185 on the dictating instrument, thereby notifying the dictator that the tape 12 has been exhausted in bin 10. If desired, a suitable buzzer or audio signaling device may also be placed in circuit with indicating light 185.

The energization of light 185 is brought about upon the closing of switch contacts 203–4 on switch 201 through conductors 113, 96, 95' and 95 leading to one side of the power supply unit 83 and conductors 190' and 190, switch 201, conductors 210, 157, 111 and 112 leading to the other side of power supply unit 83.

When the lever arm for switch 201 is held in the up position and switch contacts 203 and 204 are closed, solenoid 45, which operates roller arms 49 and 50 and roller 51 connected thereto, will be automatically de-energized by being cut off from the lead 112 of the power supply unit 83. Since solenoid 61, which controls roller 65, is connected in parallel with solenoid 45 through the medium of switch contacts 203 and 204' on switch 201, the solenoid 61 will also become de-energized. At the same time solenoid 61 is de-energized, solenoid 60 controlling roller 70 will be placed in a condition for energization. With both solenoid 45 and solenoid 61 de-energized, the tape 12 cannot be moved out of bin 10, and the length of tape held taut between rollers 24 and 25 in bin 10 is not stretched further, so that the tape is not broken.

The transcribing or reproducing of the message on the portions of the tape 12 that have fallen into bin 11 will now be described. This is accomplished through the medium of the transcribing unit 2, which may be affixed to the secretary's desk. The transcribing unit 2 includes, in addition to indicating light 154, a conventional volume control and initial actuating switch 212, a conventional earphone jack 213, earphones 214, attached thereto, a foot control jack 215, two separate foot controlled switches 216 and 217, and a terminal strip 218.

When the indicating light 154 is energized indicating that a message has been placed upon the tape 12, the secretary or transcriber may at any time thereafter, and even during the period that the dictator is still dictating, begin to transcribe the messages placed or recorded on the tape 12. To place the unit 2 in circuit the transcriber first actuates switch 212 by turning the knob 212'. The turning of knob 212' also adjusts the volume control to the proper amount in a manner well known in the art. The earphones 214 are connected to the output leads 220 of the secretary's amplifier 101 through the medium of the conductors 221, 222, 223 and 223', and the earphone jack 213. The input 224 of the amplifier 101 is connected to the coil of the reproducing head 35 through the medium of the conductors 225, 182, 227, and 226. The amplifier 101 is also connected to the power source unit 83 through conductor leads 92 and 102, 103 and 94'. The turning of knob 212' in addition to adjusting the volume, closes the contact on switch 212 connecting the power supply circuit terminal lead 91 to terminal lead 95 on power supply 83, thus energizing that unit through the medium of conductors 161', 161, 160 and 226'.

With the earphones 214 connected in the manner described above to the reproducing head 35, the operator next closes switch 216, which may be a foot controlled switch. The closing of switch 216 causes energization of solenoid 60 by connecting solenoid 60 to the power supply unit 83. Solenoid 60 is connected to one of the leads 95 of the power supply unit 83 through the medium of conductors 228', 227', 226', 160, 161 and 120 and to the other lead 112 of power supply unit 83 through the medium of conductors 228, 229', 229, 211, 157, 111, and 112.

Upon energization of solenoid 60, roller 70 will press the tape 12 directly against the rotating shaft 21 and thereby cause the tape 12 to be fed across reproducing head 35 and under the spring arm 36, around spool 24, across guide 38, and shaft 21 and into bin 10, where it falls in random folds.

As the tape 12 is passed over the reproducing head 35, the dictated message is picked up magnetically by the reproducing head 35, which is connected to the input 224 of the amplifier 101 as heretofore described. The output 220 of amplifier 101 is in turn connected to the earphones 214. The releasing of or opening of switch 216 at any time will cause de-energization of solenoid 60 and the stoppage of the tape 12 over the shaft 21 and across head 35. This in turn allows the transcriber to type the message on the tape received through the earphones 214. It will also be noted that volume control switch 212 is connected in parallel with switch 89 on the dictating instrument through conductors 161', 90, 226', 160, 161, 120, 95', 96, 113 and 114, thereby causing energization of all circuits even when the dictator is not dictating and switch 89 is open.

In the event the secretary should wish to check her copy work for any reason, she may reverse the tape 12 by depressing and closing the second foot controlled switch 217, energizing solenoid 61 and opening the first foot controlled switch 216, thereby de-energizing solenoid 60. The closing of switch 217 causes solenoid 61 to be energized by connecting solenoid 61 across the power supply unit 83. This is accomplished through the medium of conductors 235, 235', 236, 237, switch contacts 203 and 204', since the lever arm bar switch 201 is now in a down position because the tape 12 has begun to fold down into bin 10 and conductors 157, 111 and power supply unit lead 112. Solenoid 61 is connected to the other lead 95 of power supply unit 83 through the medium of conductors 228', 227', 226', 160, 161 and 120.

With solenoid 60 de-energized and solenoid 61 energized, roller 65 controlled by solenoid 61 will force the tape 12 into engagement with sleeve 72 on shaft 21 and cause the tape 12 to reverse itself in its flow from bin 11 toward bin 10 and begin traveling back down into bin 11 through opening 43, until the tape has been reversed to the amount desired. Then by depressing switch 216 again, the tape 12 will travel across head 35 again in the proper direction for message reproduction.

Due to the fact that the roller 65 presses the tape 12 against the sleeve 72 on shaft 21 and not merely against the shaft 21, the reversal speed of the tape 12 will be approximately twice that of the recording speed when the tape is brought into direct engagement with shaft 21 by energization of solenoid 60. This is of course due to the overall diameter of sleeve 72 as compared with that of the shaft 21. The same is also true with respect to the reversing of the tape 12 about shaft sleeve 56 during the periods when the dictator wishes to play back the dictation placed on the tape 12. This again is due to the overall diameter of the sleeve 56 on shaft 19 as compared with the diameter of the shaft 19 itself.

In short, it might be said that the shafts 19 and 21, because of sleeves 56 and 72, are larger during the reversal positions of the tape than during the ordinary recording and listening positions.

Should the secretary depress switch 217 and energize solenoid 61 for a sufficient period of time to cause the portion of tape 12 in bin 10 to become substantially entirely withdrawn from bin 10 and taut between rollers 24 and 25, the tension arm of switch 201 will be automatically drawn upwardly and cause contacts 204′ and 203 to open. This will in turn cause solenoid 61 to be disconnected from the power source unit 83 and to be de-energized, thereby preventing further reversal of the tape 12 and obviating the danger of breakage of the tape.

When the secretary has transcribed all of the dictation on the tape 12, the portion of the tape stored in bin 11 on which messages have been dictated will be completely withdrawn therefrom and be drawn taut against rollers 24 and 25. At this time lever arm 76 of switch 75 will be forced upward and switch contacts 152 and 153 disconnected, thereby cutting off indicator light 154 from the power supply unit 83 and de-energizing this light. This in turn will be an indication that the dictation has been transcribed.

It will also be noted, however, in the usual transcribing of the recorded messages on the tape 12, that there will still be a tail end of the recorded message on tape 12 located between the recorder head 29 and reproducing head 35 and stretching through the upper part of bin 11 and across switch 75. In order to transcribe this portion of the dictation, it is necessary that the secretary be able to move this last remaining bit of message. To accomplish this, it will be noted that switch 75 is wired in such a manner that when it is in the up position, i.e., when switch contacts 152 and 152′ thereof are closed, solenoid 60 will be placed in parallel connection with solenoid 45. It is assumed also at the same time that relay 108 is de-energized. Thus, when the switch contacts 152 and 152′ of switch 75 are closed and the switch 216 is depressed by the secretary and the contacts thereof closed, solenoids 45 and 60 will both be energized by being connected across the power supply unit 83. Solenoid 60 is connected through the medium of conductors 228, 229′, 229, 211, 157, 111, and 112 to one side of the power source unit 83, and then through conductors 228′, 227′, 226′, 160, 161, 120 and 95 to the other side of power supply unit 83. Solenoid 45 is connected in parallel to solenoid 60 through the medium of conductors 211, 229, 300, switch contact 115′ of switch 118, conductors 119 and 121, switch contact 116′ of switch 118, conductor 121′ and contacts 152′ and 152 of switch 75 and conductor 157.

This simultaneous energization of solenoids 45 and 60 brings the tape 12 into direct contact with both of the shafts 19 and 21 and thus causes the movement of the last part of the message on tape 12 across reproducing head 35.

It will also be noted that when switch arm 76 is in an up position and contacts 152 and 153 of the switch are opened, the solenoid 46 will be disconnected from the power supply unit 83 so that it will not be energized. This in turn prevents the dictator from reversing the tape 12 in bin 11 when bin 11 is empty, which action, of course, would result in a broken tape.

Furthermore, switches 216 and 217 are so wired that the pressing of both switches simultaneously will not operate or energize solenoids 60 and 61 simultaneously. The same is true of switches 98 and 131, which are mechanically interlocked to prevent simultaneous energization of solenoids 45 and 46 to prevent breakage of the tape 12. Although only one dictating and one transcribing unit are shown as being connected to the tape 12, it is obvious that additional units may also be connected to the tape if desired.

An advantageous arrangement of the invention has been shown and described. It is obvious that various changes and modifications may be made therein without departing from the spirit and scope thereof as defined by the appended claims.

It is also apparent that while the form of the present invention as shown is to be used as a dictating and transcribing apparatus that its uses are not limited to same. Any intelligence or entertainment that can be recorded on sound tape can be recorded and said recording reproduced at some interval thereafter even though the recording be not yet completed. Such applications as delayed rebroadcast of recorded network or local radio programs wherein a time lag of from a few minutes to an hour or more might be desirable are contemplated with this invention.

Other applications that might be advantages would be the recording and delayed reproduction of numerical or statistical data such as might be transmitted by telemetering and other electronic computing devices.

I claim:

1. In a recording and reproducing system the combination of a recording medium comprised of an endless magnetic tape, means for recording a message on said endless tape, means for reproducing the messages recorded on said endless tape, tape storage means located immediately adjacent said message recording means for receiving portions of the tape on which messages have been recorded, storage means separate and spaced from said first-mentioned storage means and located immediately adjacent said message reproducing means for receiving portions of the tape after the messages recorded thereon have been reproduced, means for withdrawing the portions of said tape located in said second-mentioned storage means and for feeding said portions of the tape to said message recording means for recording additional messages thereon, separate means located adjacent both said message recording and said message reproducing means for controlling the direction of travel of said tape alternately in opposite directions at said message recording and said message reproducing means, and tape breakage control means disposed in the path of travel of the tape and operable whenever the tape located in said second mentioned storage means is drawn taut between the said message recording and reproducing means for operating all of said separate tape directional control means in such a fashion that said separate tape directional control means will be rendered inoperative with respect to causing any further movement of the tape in said second mentioned storage means whereby its tautness would increase and the breakage thereof occur.

2. The combination defined in claim 1, wherein said message recording means includes a dictating unit and said message reproducing means includes a transcribing unit located remote from said dictating unit.

3. The combination defined in claim 1 including means for erasing the messages recorded and reproduced from the portions of said tape withdrawn from said last-mentioned storage means as the said portions of the tape are fed to said message recording means.

4. The combination defined in claim 1, wherein said message reproducing means is operable simultaneously with said message recording means.

5. The combination defined in claim 1 including means operable simultaneously with said last-mentioned means for withdrawing the portions of said tape located in the storage means associated with said message recording means and for feeding said last-mentioned portions of the tape to said message reproducing means.

6. In a system for message recordation and reproduction, the combination of a recording medium comprised of an endless magnetic tape, means for recording a message on said endless tape, means for reproducing the messages recorded on said endless tape, storage means associated with said message recording means for receiving and storing portions of the tape on which messages have been recorded, separate storage means associated with said message reproducing means for receiving and storing portions of the tape from which recorded messages have been reproduced by said message reproducing means, means for withdrawing the portions of the tape stored in the storage means associated with said message recording means and for feeding said portions of the tape to said message reproducing means, means operable independently of and simultaneously with said last-mentioned means for withdrawing the portions of the tape stored in the storage means associated with said message reproducing means and for feeding said portions of the tape to said message recording means, separate means located adjacent both said message recording and said message reproducing means for controlling the direction of travel of said tape alternately in opposite directions at said message recording and message reproducing means, and tape breakage control means disposed in the path of travel of the tape and operable whenever the tape located in said first mentioned storage means is drawn taut between the said message recording and message reproducing means for operating all of the said separate tape directional control means in such a fashion that said separate tape directional control means will be rendered inoperative with respect to causing any further movement of the tape in said first mentioned storage means whereby its tautness would increase and breakage thereof occur.

7. The combination defined in claim 6 including means for erasing the messages recorded and reproduced from the portions of the tape withdrawn from the storage means associated with said message reproducing means as the said portions of the tape are fed to said message recording means.

8. In a system for message recordation and reproduction the combination of a recording medium comprised of an endless magnetic tape of substantial length, a dictating unit, a message recording head, circuit means connecting said dictating unit to said message recording head, a message reproducing head, a transcribing unit, circuit means connecting said transcribing unit to said message reproducing head, a first rotatable shaft means for drawing portions of said tape across said message recording head, a second rotatable shaft means for drawing portions of said tape across said message reproducing head, means operable to place said tape in contact with different elements included in said first rotatable shaft means at different times whereby the direction of travel of said tape over said recording head can be controlled alternately in opposite directions, and means including said last-mentioned circuit means for actuating said second rotatable shaft means independently of and at a time different from the time during which said first rotatable shaft means is actuated.

9. The combination defined in claim 8 including a storage bin located adjacent said message recording head, and means including said first shaft means for feeding portions of said tape into said storage bin after messages have been recorded thereon.

10. The combination defined in claim 8 including a storage bin located adjacent said message reproducing head, and means including said second rotatable shaft means for feeding portions of said tape into said storage bin after the messages recorded on said tape have been reproduced.

11. In a system for message recordation and reproduction, the combination of a recording medium comprised of an endless magnetic tape of substantial length, a combined dictating and play back unit, a message recording and reproducing head, circuit means connecting said dictating and play back unit to said message recording and reproducing head, a transcribing unit, a message reproducing head, circuit means connecting said transcribing unit to said last-mentioned message reproducing head, rotatable shaft means for engaging and drawing portions of said tape across said message recording and reproducing head alternately in one direction and then in a reverse direction, a first switch means connecting the dictating portion of said dictating and play back unit to said message recording and reproducing head as said tape is moved across said head in one direction, a second switch means connecting said play back portion of said dictating and play back unit to said message recording and reproducing head after said tape has been first reversed a predetermined amount and then is again moved across said head in said first mentioned direction, and a second rotatable shaft means operable independently of said first-mentioned shaft means for engaging and drawing portions of said tape on which messages have been recorded across the message reproducing head connected by said second-mentioned circuit means to said transcribing unit.

12. The combination defined in claim 11 including means for disengaging said tape from said first mentioned shaft means at the time when further engagement therewith would result in stretching the tape simultaneously in opposite directions and consequent breakage of the tape.

13. The combination defined in claim 11 including means for disengaging said tape from said second mentioned shaft means at the time when further engagement therewith would result in stretching the tape simultaneously in opposite directions and consequent breakage of the tape.

14. The combination defined in claim 11, including separate storage bin means associated with each of said message recording and reproducing heads for simultaneously receiving different portions of the tape moved across the said message recording and reproducing head and said message reproducing head.

15. In a system for message recordation and reproduction of the type described, the combination of a recording medium comprised of an endless magnetic tape of substantial length, a combined dictating and play back unit, a message recording and reproducing head, circuit means including an amplifier connecting said message recording and reproducing head to said dictating and play back unit, means including a rotatable shaft rotatable in a single direction for drawing portions of said tape across said message recording and reproducing head alternately in one direction and then in a reverse direction, a plurality of separate solenoid operated lever means for bringing portions of the tape into contact with one portion of said shaft means and alternately into contact with a different portion of said shaft means so as to move portions of said tape across the said head first in one direction and then in a reverse direction, a plurality of switch elements attached to said dictating and play back unit for independently and separately actuating each of said solenoid operated lever means, a first switch means on said dictating unit for connecting the dictating portion of said dictating and play back unit to said message recording and reproducing head as said tape is moved across said head in said first direction, a second switch means on said dictating unit for connecting said play back portion of said dictating and play back unit to said message recording and reproducing head after said tape has been first reversed a predetermined amount by said rotatable shaft, and then is again moved across said head in said first mentioned direction, a second message reproducing head, a transcribing unit, circuit means including an amplifier connecting said transcribing unit to said second message reproducing head, a second rotatable shaft for drawing portions of said tape on which messages have been recorded across said second message reproducing head alternately in one direction and then in a reverse direction, a plurality of separate solenoid operated lever means for bringing said last mentioned portions of said tape into contact with one portion of said second mentioned rotatable shaft and alternately with a different portion of said second mentioned rotatable shaft so as to move said last mentioned portions of said tape across said second message reproducing head first in one direction and then in a reverse direction, a plurality of switch elements attached to said transcribing unit for independently and separately actuating each of said last mentioned solenoid operated lever means, and a switch element on said transcribing unit for energizing said circuit means connecting said transcriber unit to said second message reproducing head when said tape is moved across said message reproducing head in said first mentioned direction.

16. The combination defined in claim 15, including separate storage bin means associated with said message recording and reproducing head and said second message reproducing head for simultaneously receiving different portions of the tape drawn across the said message recording and reproducing head and said second message reproducing head during the dictation of a message on one portion of the tape and the transcription of a dictated message from another portion of the tape.

17. In a system for message recordation and reproduction, the combination of a recording medium comprising an endless magnetic tape of substantial length, a dictating unit, a message recording head, circuit means connecting said dictating unit to said message recording head, a message reproducing head, a transcribing unit, circuit means connecting said transcribing unit to said message reproducing head, a first rotatable shaft means for drawing one portion of said tape across said recording head, a second rotatable shaft means for drawing a different portion of said tape across said message reproducing head, means for actuating said first shaft means alternately in one direction and then in the opposite direction, means for actuating said second shaft means independently of and at the same time that said first shaft means is actuated, and a tape breakage control means disposed intermediate the recording and reproducing heads and in the path of travel of the tape therebetween, said tape breakage control means being operable, whenever the tape is drawn taut between the recording and reproducing heads as by virtue of the movement at the same time of different portions of the tape in opposite directions and across both said recording and reproducing heads, for operating all of the said actuating means for all of the rotatable shaft means in such a fashion that all of said actuating means will be rendered inoperative with respect to causing any further movement of the tape whereby its tautness would increase and breakage thereof occur.

18. The system set forth in claim 17 wherein said tape breakage control means includes a switch means and a lever for operating said switch means, said lever being controlled by said tape.

19. The system set forth in claim 17 wherein said tape breakage control means includes means disposed adjacent the message reproducing head for neutralizing the tape breakage control means to the point where the operator at the message reproducing head can effect movement of the tape from said recording head to said reproducing head whereby the last part of any message on the tape can be reproduced.

References Cited in the file of this patent

UNITED STATES PATENTS

| | | |
|---|---|---|
| 1,166,925 | Ober | Jan. 4, 1916 |
| 2,410,569 | Conant | Nov. 5, 1946 |
| 2,431,646 | Kenney | Nov. 25, 1947 |
| 2,519,725 | White | Aug. 22, 1950 |
| 2,542,506 | Gibson | Feb. 20, 1951 |
| 2,633,503 | Camras | Mar. 31, 1953 |

FOREIGN PATENTS

| | | |
|---|---|---|
| 585,258 | Germany | Sept. 30, 1933 |
| 688,567 | Great Britain | Mar. 11, 1953 |
| 828,450 | Germany | Jan. 17, 1952 |